United States Patent
Allen et al.

(10) Patent No.: US 6,872,686 B2
(45) Date of Patent: Mar. 29, 2005

(54) HYDROPHOBIC CATALYTIC MATERIALS AND METHOD OF FORMING THE SAME

(75) Inventors: Fred M. Allen, Princeton Jct., NJ (US); Patrick W. Blosser, East Windsor, NJ (US); Ronald M. Heck, Frenchtown, NJ (US); Jeffrey B. Hoke, North Brunswick, NJ (US); Terence C. Poles, Ringoes, NJ (US); John J. Steger, Pittstown, NJ (US)

(73) Assignee: Engelhard Corporation, Iselin, NJ (US)

(*) Notice: Subject to any disclaimer, the term of this patent is extended or adjusted under 35 U.S.C. 154(b) by 30 days.

(21) Appl. No.: 10/744,398

(22) Filed: Dec. 23, 2003

(65) Prior Publication Data

US 2004/0138061 A1 Jul. 15, 2004

Related U.S. Application Data

(60) Continuation of application No. 10/430,141, filed on May 6, 2003, now Pat. No. 6,685,898, which is a division of application No. 09/716,035, filed on Nov. 17, 2000, now Pat. No. 6,586,359, which is a division of application No. 09/046,103, filed on Mar. 23, 1998, now Pat. No. 6,156,283.

(51) Int. Cl.$^7$ .............................................. B01J 23/32
(52) U.S. Cl. ..................................................... 502/324
(58) Field of Search ........................................ 502/324

(56) References Cited

U.S. PATENT DOCUMENTS

| | | | |
|---|---|---|---|
| 1,484,782 | A | 2/1924 | Heise |
| 1,628,344 | A | 5/1927 | Walsh |
| 1,863,015 | A | 6/1932 | Kamrath |

(Continued)

FOREIGN PATENT DOCUMENTS

| | | | |
|---|---|---|---|
| DE | 822 053 | 11/1951 | ................... 63/73 |
| DE | 1067691 | 10/1959 | |
| DE | 1095128 | 12/1960 | |

(Continued)

OTHER PUBLICATIONS

SAE 931088 Calculation and Design of Cooling Systems by Eichiseder & Raab of Steyr Damler Puchag.
SAE 931089 Charge Air Cooler for Passenger Cars by Thierry Collette of Valeo Thermique Moteur.
SAE 931092 State of the Art & Future Developments of Aluminum Radiators for Cars & Trucks by Josef Kern & Jochen Eitel of Behr GmbH & Company.

(Continued)

*Primary Examiner*—Cam N. Nguyen
(74) *Attorney, Agent, or Firm*—Russell G. Lindenfeldar

(57) ABSTRACT

A catalytic composition and method of making the same in which a catalytic material has an average pore size distribution sufficiently large to substantially prevent capillary condensation.

1 Claim, 3 Drawing Sheets

U.S. PATENT DOCUMENTS

| | | | |
|---|---|---|---|
| 1,937,488 A | 11/1933 | Jenness | 23/234 |
| 1,937,489 A | 11/1933 | Jenness | 23/234 |
| 2,213,017 A | 8/1940 | Perkins | 98/2 |
| 2,455,734 A | 12/1948 | Clausen | 183/53 |
| 2,473,563 A | 6/1949 | Beja et al. | 23/145 |
| 2,551,823 A | 5/1951 | Buttner et al. | 237/28 |
| 2,658,742 A | 11/1953 | Suter et al. | 263/3 |
| 2,701,104 A | 2/1955 | Fox | 241/3 |
| 2,956,860 A | 10/1960 | Welsh | 23/145 |
| 2,966,339 A | 12/1960 | Morgan | 257/1 |
| 3,110,300 A | 11/1963 | Brown et al. | 126/109 |
| 3,147,100 A | 9/1964 | Wilber | 55/419 |
| 3,242,013 A | 3/1966 | Mehne et al. | 136/138 |
| 3,269,801 A | 8/1966 | Boberg et al. | 23/238 |
| 3,356,452 A | 12/1967 | Moore | 23/145 |
| 3,414,440 A | 12/1968 | Moore | 136/107 |
| 3,565,203 A | 2/1971 | Ashton et al. | 180/68 |
| 3,596,441 A | 8/1971 | Luedahl | 55/376 |
| 3,640,683 A | 2/1972 | Miyazaki et al. | 23/145 |
| 3,685,983 A | 8/1972 | Louzos | 75/0.5 R |
| 3,738,088 A | 6/1973 | Colosimo | 55/104 |
| 3,770,868 A | 11/1973 | Swinkels et al. | 423/50 |
| 3,823,533 A | 7/1974 | Alverson et al. | 55/493 |
| 3,837,149 A | 9/1974 | West et al. | 55/269 |
| 3,859,788 A | 1/1975 | King et al. | 60/280 |
| 3,864,118 A | 2/1975 | Schumacher et al. | 75/3 |
| 3,883,637 A | 5/1975 | Benedict | 423/230 |
| 3,915,837 A | 10/1975 | Feige, Jr. | 204/286 |
| 3,959,021 A | 5/1976 | Nishino et al. | 136/138 |
| 3,993,597 A | 11/1976 | Stiles | 252/454 |
| 4,006,217 A | 2/1977 | Faber et al. | 423/605 |
| 4,007,875 A | 2/1977 | Stolz et al. | 237/12.3 A |
| 4,059,544 A | 11/1977 | Yamaguchi et al. | 252/471 |
| 4,089,928 A | 5/1978 | Foroglou | 423/49 |
| 4,101,296 A | 7/1978 | Lowther | 55/33 |
| 4,134,860 A | 1/1979 | Hindin et al. | 252/466 PT |
| 4,141,963 A | 2/1979 | Miller | 423/592 |
| 4,160,806 A | 7/1979 | Long et al. | 422/223 |
| 4,171,211 A | 10/1979 | Carter | 55/493 |
| 4,173,549 A | 11/1979 | Kent et al. | 252/463 |
| 4,184,983 A | 1/1980 | Putz et al. | 252/466 PT |
| 4,195,606 A | 4/1980 | Wallis, Jr. et al. | 123/119 E |
| 4,197,366 A | 4/1980 | Tamura et al. | 429/197 |
| 4,200,609 A | 4/1980 | Byrd | 422/122 |
| 4,206,083 A | 6/1980 | Chang | 252/455 R |
| 4,207,291 A | 6/1980 | Byrd et al. | 422/122 |
| 4,214,867 A | 7/1980 | Hunter et al. | 432/29 |
| 4,234,326 A | 11/1980 | Bailey et al. | 55/278 |
| 4,237,030 A | 12/1980 | Noguchi et al. | 252/432 |
| 4,246,253 A | 1/1981 | Hunter | 423/605 |
| 4,261,863 A | 4/1981 | Kent et al. | 252/463 |
| 4,277,360 A | 7/1981 | Mellors et al. | 252/182.1 |
| 4,284,618 A | 8/1981 | Van der Heyden et al. | 423/605 |
| 4,285,913 A | 8/1981 | Soni et al. | 423/50 |
| 4,302,490 A | 11/1981 | Byrd | 427/301 |
| 4,310,494 A | 1/1982 | Welsh | 423/49 |
| 4,324,645 A | 4/1982 | Angevine et al. | 208/50 |
| 4,343,776 A | 8/1982 | Carr et al. | 423/210 |
| 4,348,360 A | 9/1982 | Chang et al. | 422/122 |
| 4,352,321 A | 10/1982 | Fukui et al. | 98/2.11 |
| 4,353,815 A | 10/1982 | Antos | 252/466 PT |
| 4,363,787 A | 12/1982 | Yoon | 422/201 |
| 4,367,165 A | 1/1983 | Asaoka et al. | 252/457 |
| 4,379,129 A | 4/1983 | Abe | 423/210 |
| 4,379,817 A | 4/1983 | Kozawa | 429/224 |
| 4,399,185 A | 8/1983 | Petrow | 428/253 |
| 4,402,931 A | 9/1983 | Tanabe et al. | 423/605 |
| 4,405,507 A | 9/1983 | Carr et al. | 252/466 B |
| 4,405,699 A | 9/1983 | Kruger | 429/224 |
| 4,425,145 A | 1/1984 | Reese | 55/385 B |
| 4,476,104 A | 10/1984 | Mellors | 423/605 |
| 4,483,828 A | 11/1984 | Laughlin et al. | 423/49 |
| 4,485,073 A | 11/1984 | Robertson et al. | 423/49 |
| 4,489,043 A | 12/1984 | Bowerman et al. | 423/49 |
| 4,537,839 A | 8/1985 | Cameron | 429/20 |
| 4,551,254 A | 11/1985 | Imada et al. | 210/688 |
| 4,579,723 A | 4/1986 | Weltmer et al. | 423/219 |
| 4,581,219 A | 4/1986 | Imada et al. | 423/605 |
| 4,585,718 A | 4/1986 | Uedaira et al. | 429/224 |
| 4,590,059 A | 5/1986 | Mellors | 423/605 |
| 4,595,643 A | 6/1986 | Koshiba et al. | 429/27 |
| 4,604,336 A | 8/1986 | Nardi | 429/224 |
| 4,619,821 A | 10/1986 | Ely | 423/579 |
| 4,625,023 A | 11/1986 | Mares et al. | 540/539 |
| 4,657,887 A | 4/1987 | Hardman et al. | 502/303 |
| 4,657,889 A | 4/1987 | Ganguli et al. | 502/335 |
| 4,662,065 A | 5/1987 | Marincic et al. | 29/623.1 |
| 4,665,973 A | 5/1987 | Limberg et al. | 165/133 |
| 4,666,677 A | 5/1987 | Ramus et al. | 422/183 |
| 4,670,474 A | 6/1987 | Hinnenkamp et al. | 518/713 |
| 4,684,381 A | 8/1987 | Wasylyniuk | 55/316 |
| 4,714,694 A | 12/1987 | Wan et al. | 502/304 |
| 4,733,605 A | 3/1988 | Holter et al. | 98/2.11 |
| 4,734,113 A | 3/1988 | Takagi et al. | 55/504 |
| 4,738,947 A | 4/1988 | Wan et al. | 502/304 |
| 4,742,038 A | 5/1988 | Matsumoto | 502/303 |
| 4,818,354 A | 4/1989 | Preisler et al. | 204/96 |
| 4,824,363 A | 4/1989 | Abthoff et al. | 432/222 |
| 4,838,910 A | 6/1989 | Stollenwerk et al. | 55/385.2 |
| 4,857,499 A | 8/1989 | Ito et al. | 502/326 |
| 4,871,709 A | 10/1989 | Tatsushima et al. | 502/324 |
| 4,888,316 A | 12/1989 | Gardner et al. | 520/20 |
| 4,909,815 A | 3/1990 | Meyer | 55/316 |
| 4,921,689 A | 5/1990 | Walker et al. | 423/605 |
| 4,961,762 A | 10/1990 | Howeth | 55/302 |
| 4,975,346 A | 12/1990 | Lecerf et al. | 429/197 |
| 5,004,487 A | 4/1991 | Kowalczyk | 55/269 |
| 5,010,051 A | 4/1991 | Rudy | 502/304 |
| 5,024,981 A | 6/1991 | Speronello et al. | 502/67 |
| 5,057,483 A | 10/1991 | Wan | 502/304 |
| 5,080,882 A | 1/1992 | Yoshimoto et al. | 423/579 |
| 5,082,570 A | 1/1992 | Higgins et al. | 210/683 |
| 5,085,266 A | 2/1992 | Arold et al. | 165/1 |
| 5,092,396 A | 3/1992 | Murano et al. | 165/119 |
| 5,113,836 A | 5/1992 | Sweeten | 123/573 |
| 5,124,303 A | 6/1992 | Kobayashi et al. | 502/241 |
| 5,128,306 A | 7/1992 | Dettling et al. | 502/304 |
| 5,130,109 A | 7/1992 | Wan | 423/213.2 |
| 5,134,109 A | 7/1992 | Uchiyama et al. | 502/324 |
| 5,139,992 A | 8/1992 | Tauster et al. | 502/304 |
| 5,142,864 A | 9/1992 | Dunne | 60/274 |
| 5,145,657 A | 9/1992 | Kobayashi et al. | 423/219 |
| 5,145,822 A | 9/1992 | Falke et al. | 502/150 |
| 5,145,825 A | 9/1992 | Deeba et al. | 502/242 |
| 5,147,429 A | 9/1992 | Bartholomew et al. | 55/356 |
| 5,160,586 A | 11/1992 | Yoshimoto et al. | 204/59 R |
| 5,162,274 A | 11/1992 | Deitz | 502/51 |
| 5,166,012 A | 11/1992 | Rossouw et al. | 429/224 |
| 5,176,833 A | 1/1993 | Vaughn et al. | 210/638 |
| 5,180,502 A | 1/1993 | Nishiki et al. | 210/748 |
| 5,187,137 A | 2/1993 | Terui et al. | 502/241 |
| 5,194,233 A | 3/1993 | Kitahara et al. | 423/210 |
| 5,212,140 A | 5/1993 | Yoshimoto et al. | 502/300 |
| 5,212,142 A | 5/1993 | Dettling | 502/304 |
| 5,214,014 A | 5/1993 | Yoshimoto et al. | 502/84 |
| 5,221,649 A | 6/1993 | Yoshimoto et al. | 502/84 |
| 5,221,652 A | 6/1993 | Tierney et al. | 502/170 |
| 5,221,656 A | 6/1993 | Clark et al. | 502/315 |
| 5,227,144 A | 7/1993 | Perez de la Garza | 423/210 |
| 5,232,882 A | 8/1993 | Yoshimoto et al. | 502/5 |
| 5,232,886 A | 8/1993 | Yoshimoto et al. | 502/84 |

| | | | | |
|---|---|---|---|---|
| 5,250,487 A | 10/1993 | Wirtz et al. | | 502/243 |
| 5,252,299 A | 10/1993 | Retallick | | 422/174 |
| 5,254,519 A | 10/1993 | Wan et al. | | 502/252 |
| 5,262,129 A | 11/1993 | Terada et al. | | 422/122 |
| 5,277,890 A | 1/1994 | Wang et al. | | 423/605 |
| 5,283,041 A | 2/1994 | Nguyen et al. | | 423/240 S |
| 5,283,139 A | 2/1994 | Newman et al. | | 429/224 |
| 5,290,530 A | 3/1994 | Muramatsu et al. | | 423/239 |
| 5,294,499 A | 3/1994 | Furukawa et al. | | 429/164 |
| 5,296,435 A | 3/1994 | Kitaguchi et al. | | 502/174 |
| 5,308,591 A | 5/1994 | Whittenberger | | 422/174 |
| 5,317,869 A | 6/1994 | Takeuchi | | 60/300 |
| 5,340,562 A | 8/1994 | O'Young et al. | | 423/599 |
| 5,348,726 A | 9/1994 | Wang et al. | | 423/605 |
| 5,356,457 A | 10/1994 | Pincheira Alvarez et al. | | 75/710 |
| 5,382,417 A | 1/1995 | Haase | | 423/219 |
| 5,391,365 A | 2/1995 | Wang et al. | | 423/605 |
| 5,395,534 A | 3/1995 | Smith | | 210/688 |
| 5,401,477 A | 3/1995 | Cawlfield et al. | | 423/50 |
| 5,405,594 A | 4/1995 | Andersen et al. | | 423/605 |
| 5,411,643 A | 5/1995 | Cawlfield et al. | | 204/115 |
| 5,419,882 A | 5/1995 | Jibiki | | 423/111 |
| 5,422,331 A | 6/1995 | Galligan et al. | | 502/333 |
| 5,447,693 A | 9/1995 | Ohta et al. | | 422/122 |
| 5,523,509 A | 6/1996 | O'Young et al. | | 585/640 |
| 5,620,672 A | 4/1997 | Galligan et al. | | 423/219 |
| 5,635,155 A | 6/1997 | O'Young et al. | | 423/599 |
| 5,645,804 A | 7/1997 | Sumiya et al. | | 423/239.1 |
| 5,676,913 A | 10/1997 | Cirillo et al. | | |
| 5,702,674 A | 12/1997 | O'Young et al. | | 423/50 |
| 5,705,078 A | 1/1998 | Kurek et al. | | 210/759 |
| 5,817,595 A | 10/1998 | Tejada et al. | | 502/313 |
| 5,846,641 A | 12/1998 | Abeles et al. | | 428/312.4 |
| 6,162,530 A | 12/2000 | Xiao et al. | | 428/292.1 |
| 6,200,542 B1 | 3/2001 | Poles et al. | | 423/210 |
| 6,214,303 B1 | 4/2001 | Hoke et al. | | 423/210 |
| 6,340,066 B1 | 1/2002 | Dettling et al. | | 180/54.1 |

FOREIGN PATENT DOCUMENTS

| | | | | |
|---|---|---|---|---|
| DE | 1101160 | 2/1961 | | |
| DE | 1133154 | 7/1962 | | |
| DE | 215 5738 | 1/1973 | | B60H/3/06 |
| DE | 25 49 621 A1 | 5/1977 | | H01M/4/90 |
| DE | 30 19 828 | 11/1980 | | C09D/7/12 |
| DE | 33 34 992 A1 | 4/1985 | | B60H/3/00 |
| DE | 37 13 035 A1 | 10/1988 | | B65D/90/28 |
| DE | 4007964 A1 | 9/1991 | | B01J/23/72 |
| DE | 40 07 965 A1 | 9/1991 | | B01J/23/84 |
| DE | 40 17 892 A1 | 12/1991 | | B01J/23/89 |
| DE | 42 09 196 C1 | 7/1993 | | B01D/53/36 |
| DE | 42 09 198 C1 | 7/1993 | | B01D/53/36 |
| DE | 40 07 965 C2 | 3/1994 | | B01J/23/72 |
| DE | 43 18 738 C1 | 7/1994 | | B01D/53/36 |
| DE | 44 20 224 A1 | 1/1995 | | B01D/53/86 |
| DE | 44 23 329 A1 | 1/1995 | | B01D/53/86 |
| DE | 94 15 457 | 5/1995 | | B01D/53/86 |
| DE | 195 38 799 A | 4/1997 | | |
| EP | 0 097 287 A2 | 1/1984 | | F28D/1/04 |
| EP | 0 186 477 | 7/1986 | | F24F/3/12 |
| EP | 0 186 477 B1 | 7/1986 | | F24F/3/12 |
| EP | 0 268 265 A | 5/1988 | | |
| EP | 0 351 036 A1 | 1/1990 | | B01J/35/02 |
| EP | 0 373 648 B1 | 6/1990 | | B01J/35/04 |
| EP | 0 431 648 A1 | 6/1991 | | A61L/9/015 |
| EP | 470 330 A1 | 2/1992 | | F02M/35/024 |
| EP | 0 537 815 B1 | 4/1993 | | C10G/47/14 |
| EP | 0 537 815 A1 | 4/1993 | | C10G/47/14 |
| EP | 0 561 484 A1 | 9/1993 | | B01D/53/36 |
| EP | 0 628 338 A1 | 12/1994 | | B01D/53/34 |
| EP | 0 634 205 A1 | 1/1995 | | B01D/53/66 |
| EP | 0 635 685 A1 | 1/1995 | | F24F/3/16 |
| EP | 0 653 956 B1 | 5/1995 | | B01D/53/66 |
| EP | 0 666 776 B1 | 8/1995 | | B01J/35/04 |
| EP | 0 723 811 A | 7/1996 | | |
| GB | 2 009 392 | 6/1979 | | F24F/7/06 |
| GB | 2 037 607 B | 7/1980 | | B01J/19/24 |
| GB | 2 056 424 A | 3/1981 | | B01D/53/36 |
| GB | 2 056 424 B | 3/1981 | | B01D/63/36 |
| GB | 2 110 174 A | 6/1983 | | B60K/13/02 |
| GB | 2 218 354 A | 11/1989 | | B01D/50/00 |
| JP | 7-4011141 | 3/1974 | | B01D/53/34 |
| JP | 52148468 | 12/1977 | | B01D/53/34 |
| JP | 55106813 | 8/1980 | | B60H/1/24 |
| JP | 56059671 | 5/1981 | | B01J/20/06 |
| JP | 57122924 | 7/1982 | | B01D/53/36 |
| JP | 61035853 | 2/1986 | | B01D/53/36 |
| JP | 3-229645 | 3/1991 | | |
| JP | 4-110045 | 4/1992 | | B01D/53/36 |
| JP | H4-176316 | 6/1992 | | B01D/53/54 |
| JP | H4-297341 | 10/1992 | | B60P/3/00 |
| JP | 40-5007776 A | 1/1993 | | B01J/23/64 |
| JP | 5023590 | 2/1993 | | B01D/53/36 |
| JP | 5038443 | 2/1993 | | B01D/53/36 |
| JP | H6-13204 | 1/1994 | | H01C/7/02 |
| SU | 1 703 173 | 1/1992 | | B01J/37/30 |
| WO | WO 94/27709 | 12/1984 | | B01D/53/36 |
| WO | WO 90/11433 | 4/1990 | | B08B/15/00 |
| WO | WO 91/09755 | 7/1991 | | B60R/27/00 |
| WO | WO 93/05821 | 4/1993 | | A61L/9/20 |
| WO | 93/10886 | 6/1993 | | |
| WO | WO 95/22395 | 8/1995 | | B01D/53/75 |
| WO | WO 96/09109 | 3/1996 | | B01D/53/86 |
| WO | WO 96/22146 | 7/1996 | | B01D/53/68 |
| WO | WO 96/22148 | 7/1996 | | B01D/53/88 |
| WO | 97/11769 | 4/1997 | | |
| WO | WO 97/41948 | 11/1997 | | B01D/53/86 |
| WO | 98/05412 | 2/1998 | | |
| WO | WO 98/06479 | 2/1998 | | B01D/53/86 |
| WO | WO 98/06480 | 2/1998 | | B01D/53/86 |

OTHER PUBLICATIONS

SAE 931112 Air Max versus Coolant Flow to Control Discharge Air Temperature in Vehicle Heating and Air Conditioning Systems by Gary Rolling and Robert Cummings of Behr of America, Inc., and Gebhard Schweizer of Behr GmbH & Company.

SAE 931115 Engine Cooling Module Development Using Air Flow Management Technique by Refki El–Bourini & Samuel Chen of Calsonic Technical Center.

SAE 931120 A New Zeolite Energy Storage Concept for Cooling & Heating Sleeping Cabins in Trucks by Manfred Nonnenmann & Noureddine Khellifa of Behr GmbH & Company.

SAE 931121 Automotive Evaporator and Condenser Modelling by Franscisco Castro, Francisco Tinaut & A.A. Rahman Ali of Universidad de Valladolid.

SAE 931125 Durability Concerns of Aluminum Air to Air Charge Air Coolers by Paul Richard Smith of Valeo Engine Cooling Inc.

Derwent Abstracts.

Additive for Dispersion Technology, publishing by Rhone Poulene.

Bosch Automotive Handbook, Second Edition, pp. 301–303, and 349–51 published by Robert Bosch GmbH, 1986.

Gerhartz et al., Ullmann's Encyclopedia of Industrial Chemistry, Ed. 5, vol. A5, Cancer Chemotherapy to Ceramic Colorants, 1986, VCH Verlag, De, Weinheim, pp. 336, 347–353.

Manganese Compounds, vol. 15, pp. 1003–1050.

Mark, et al., Kirk–Othmer Encyclopedia of Chemical Technology, Ed. 3, vol. 5, Castor Oil to Chlorosulfuric Acid, 1989, Wiley & Sons, NY, pp. 22–23, 40, 49–51.

"Microstructural Study of Hollandite–type $MnO_2$Nano–fibers", M. Benaissa et al., *App. Physics Letters*, vol. 70, No. 16, pp. 2120–2122 (1977).

"Nickel Hydroxide and Other Nanophase Cathode Materials for Rechargeable Batteries", D.E. Reisner et al., *J. Power Sources*, vol. 65, No. 1–2, pp. 231–233 (1977).

Taylor, The Internal Combustion Engine in Theory and Practice, vol. 1: Thermo Dynamics, Fluid Flow, Performance, Second Edition, Rev.; The MIT Press, 1985 at pp. 304–306 for radiator and fin design; and p. 392 for after coolers.

McKenzie,"The Synthesis of Birnessite, Cryptomelane, and Some Other Oxides and Hydroxides of Manganese", Mineralogical Magazine, Dec. 1971, vol 38, pp. 493–502.

Newspaper Article with Informal Translation—Mobile Air Purification.

Newspaper Article with Informal Translation—Super–Kat in Cars ensures clean air forever.

O'Young, "Hydrothermal Synthesis of Manganese Oxides with Tunnel Structures" Symposium on Advances in Zeolites and Pillared Clay Structures, the Division of Petroleum Chemistry, Inc., American Chemical Society, New York City Meeting, Aug. 25–30, 1991, pp. 348–355.

Outside submission from Litman Law Offices, Ltd., in the Application of Leo K. Brown for an "Environmental Air Filtration System for Vehicles".

Outside submission from Attorney Conrad O. Gardner in the Application of "A System for Ambient Air Pollution Processing by Motor Vehicles".

A Review of Porous Manganese Oxide Materials, Chem. Materials, 1998, 10, 2619–2628 (Brock).

Ozone Conversion vs. Relative Humidity

HYDROPHOBIC CATALYTIC MATERIALS AND METHOD OF FORMING THE SAME

CROSS REFERENCE TO RELATED APPLICATIONS

This application is a continuation of U.S. application Ser. No. 10/430,141 filed May 6, 2003, U.S. Pat. No. 6,685,898; which is a divisional of U.S. application Ser. No. 09/716,035 filed Nov. 17, 2000, U.S. Pat. No. 6,586,359; which is a divisional of U.S. application Ser. No. 09/046,103 filed Mar. 23, 1998, U.S. Pat. No. 6,156,283; all of the foregoing are hereby incorporated by reference into this application.

FIELD OF THE INVENTION

The present invention is directed to a method of treating pollutant-containing gases in which such gases are contacted with a catalyst composition containing at least one catalytic material which has an average pore size and surface area sufficient to prevent or at least substantially reduce capillary condensation.

BACKGROUND OF THE INVENTION

The present invention is directed to a method of forming catalytic materials in such a manner that the catalytic material does not substantially undergo capillary condensation. Accordingly, the adverse effect that water vapor has on catalytic activity of the catalytic material is minimized.

Catalytic materials, especially for removing pollutants from a pollutant-containing gas are generally comprised of metals as well as other constituents which actively induce a chemical reaction. The effectiveness of a catalytic material depends in part on the availability of catalytically active sites. The more catalytically active sites available from a given catalyst, the more efficiently the catalytic material can promote the desired reaction.

Catalytic materials are used to induce the reaction of pollutants contained within a pollutant-containing gas into harmless by-products. There are numerous pollutants which are found in the atmosphere and/or contained within gas discharged from industrial facilities or automotive vehicles. Such pollutants include hydrocarbons, carbon monoxide, ozone, sulfur compounds and $NO_x$ compounds.

If a potentially catalytically active site is blocked then its availability to catalyze the chemical reaction of a pollutant is eliminated or at least substantially reduced. Compounds which block catalytically active sites do so by binding to the catalytic material so that at least a portion of the time the catalytically active site is unavailable for catalyzing a reaction. The stronger the bond between the blocking compound and the catalytically active site, the less efficient the catalytic material is in inducing a chemical reaction to convert pollutants to harmless by-products.

It is well known that water molecules have an affinity for catalytic materials, especially metals. Accordingly, water serves as a blocking compound which reversibly binds to catalytically active sites. The bond between water molecules and catalytically active sites is typically of moderate strength so that the water molecules spend only a portion of the time bound to the catalytically active site. When the water molecule is so bound, the particular catalytically active site is incapable of inducing a chemical reaction to convert pollutants to harmless by-products.

Catalytic materials including those incorporating precious metals, base metals and the like are employed in catalytic compositions for the treatment of pollutant-containing gases such as exhaust gas from automotive vehicles. The exhaust gases typically contain moisture or water vapor and the amount of water vapor will vary depending on climatic conditions. As previously indicated, the presence of water molecules can impede the effectiveness of a catalytic material because water acts as a blocking compound.

During normal operation of an automotive vehicle, the temperature of the exhaust gas will be several hundred degrees. Under these high temperature conditions, water molecules are energized due to the input of thermal energy. Highly energized molecules tend to remain in motion. This high energy level limits the time the water molecules remain bound to catalytically active sites. Accordingly, the presence of water vapor under high temperature operating conditions does not adversely affect the efficiency of catalytic materials to the same extent as under lower temperature operating conditions when water molecules are less energized. Under less energized conditions, water molecules tend to bind to catalytically active sites for a greater length of time than under high energy conditions (e.g. higher temperatures).

Catalytic materials are generally manufactured with a preference for high surface areas so as to enable a greater number of catalytic sites to catalyze the reaction of pollutants contained within a pollutant-containing gas. High surface area catalytic materials can be produced by employing a pore structure comprised of micropores having an average pore size as low as possible, typically less than 5 nanometers (nm). Smaller pores therefore, are characteristic of high surface area catalytic materials.

It has been observed that catalytic materials having an average pore size of less than about 5 nm, undesirably retain moisture especially under high humidity and low temperature (i.e. low energy) conditions. When water vapor is in contact with such materials, molecules of water enter the relatively small pores and remain within the pores. This phenomenon is known as capillary condensation.

"Capillary condensation" as used herein means that water molecules enter and remain within the micropore structure of the catalytic material. Because the micropores have very small pore sizes (typically less than 5 nm), the water molecules become "stuck" in the pores and can be removed only with some difficulty. The retention of water molecules in micropores (capillary condensation) reduces the effectiveness of catalytic materials because the water molecules block the catalytically active sites as previously described. In particular, the number of catalytically active sites available to catalyze the reaction of a pollutant is reduced and therefore the efficiency of the catalytic material is impaired.

It would therefore be a significant advance in the art of removing pollutants from a pollutant-containing gas to provide catalytic materials in which capillary condensation is prevented or at least substantially minimized. It would be another advance in the art to produce catalytic materials which can be used in automotive vehicles to remove pollutants from a pollutant-containing gas under high humidity and/or low temperature operating conditions.

SUMMARY OF THE INVENTION

The present invention is generally directed to a method of treating a pollutant-containing gas with a catalytic material in which the presence of water vapor, even under high relative humidity conditions and/or low temperature operating conditions, does not substantially adversely affect catalyst performance. Catalytic materials which can perform in this manner are also encompassed by the present invention.

In particular, the present invention is directed to a catalytic composition and method of treating a pollutant-containing gas comprising contacting the pollutant-containing gas with a catalyst composition containing at least one catalytic material which has an average pore size of at least 5 nm and a surface area sufficiently large to enable the catalytic material to react with the pollutant in the pollutant-containing gas. As a result capillary condensation is at least substantially prevented whereby there is sufficient accessability of the catalytically active sites to induce a reaction of the pollutant to produce harmless by-products.

In a preferred form of the invention, there is provided a method of treating a pollutant-containing gas even under high humidity and/or reduced temperature conditions in which the catalytic material has an average pore size of at least 10 nm. Catalytic materials employed in the present method are also the subject of the present invention.

The catalytic material, in addition to having an average pore size of at least 5 nm distribution as described above, also has a relatively large surface area, typically at least 100 $m^2/g$. Preferably, the catalytic material has a relatively high total pore volume, typically at least 0.9 $cm^3/g$.

BRIEF DESCRIPTION OF THE DRAWINGS

The following drawings are illustrative of embodiments of the invention and are not intended to limit the invention as encompassed by the claims forming part of the application.

DETAILED DESCRIPTION OF THE INVENTION

The catalytic materials of the present invention have an average pore size and a surface area sufficient to prevent or at least substantially reduce capillary condensation. In a preferred form of the invention, the total pore volume of the catalytic material is selected to further minimize capillary condensation. As previously explained, capillary condensation occurs when water molecules enter micropores of a catalytic material and become retained therein because the small size of the pores makes it difficult for the water to be removed in the absence of raising the energy level of the water molecules such as occurs at elevated temperatures (e.g. temperatures of at least about 100° C.). As used herein the term "average pore size" shall mean the average pore diameter of the pores of the catalytic material.

It has been observed that condensation of water occurs in the pores of catalytic materials having an average pore size of less than 5 nm, especially at a relative humidity of at least about 50%. The relative humidity is based on the partial pressure of the water in the air and the saturation vapor pressure at the catalyst operating temperature. The filing of pores with water molecules via capillary condensation is governed by the formula $$RT\ln\left(\frac{P}{P_0}\right) = \frac{-V\gamma\cos(\theta)}{D},$$

where R is the gas constant (8.31 Joules/mole/K), T is the operating temperature of catalyst system, ln is the natural logarithm, P is the partial pressure of water vapor, $P_0$ is the saturation vapor pressure of water at the operating temperature T, V is the molar volume of water (18 $cm^3$/mole), γ is the surface tension of water (72.6 dynes/cm), θ is the contact angle and D is the capillary diameter (cm). The contact angle is the angle formed between the liquid surface and a solid surface. For hydrophilic surfaces, the contact angle is generally between about 0 and 90 degrees. For hydrophobic surfaces, the contact angle is generally between about 90 and 180 degrees. The contact angle for metal oxide surfaces (e.g. alumina) is typically less than 90°.

Applicants have discovered that when a catalytic material is provided with an average pore size of at least 5 nm and a surface area of at least 100 $m^2/g$ capillary condensation is prevented or at least substantially reduced.

Figure 1:
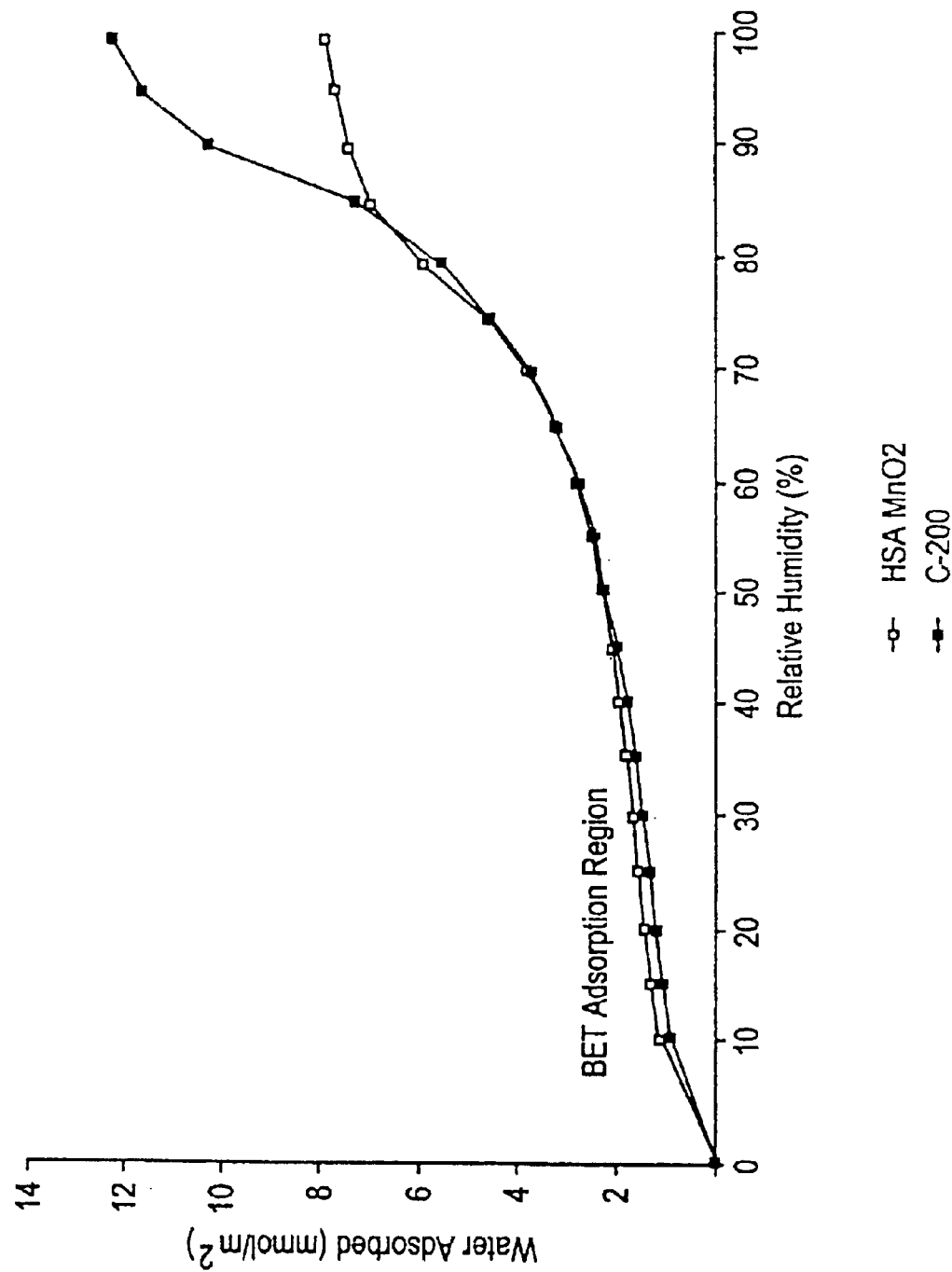
FIG. 1 is a graph showing the amount of water adsorbed by two catalysts as a function of relative humidity.

Referring to FIG. 1 there is shown a graph depicting the relationship between water adsorption and relative humidity for two different manganese oxide based catalytic materials. The first of the catalytic materials is Carulite® 200 produced by Carus Chemicals, Inc. and the second is HSA (a high surface area) $MnO_2$ produced by Chemetals, Inc. As shown in FIG. 1, water adsorption for each of the catalytic materials is relatively low until the relative humidity reaches about 50%. Water adsorption below a relative humidity of about 50% is due principally to multi-layer adsorption. Multilayer adsorption is the formation of multiple thin layers of moisture which does not substantially prevent access of the pollutant-containing gas to the catalytic material contained within the pores. At a relative humidity of about 50%, the amount of water adsorbed increases significantly due to capillary condensation.

In accordance with the present invention, the average pore size and the relative humidity of the atmosphere impact on whether or not capillary condensation occurs.

Figure 2:
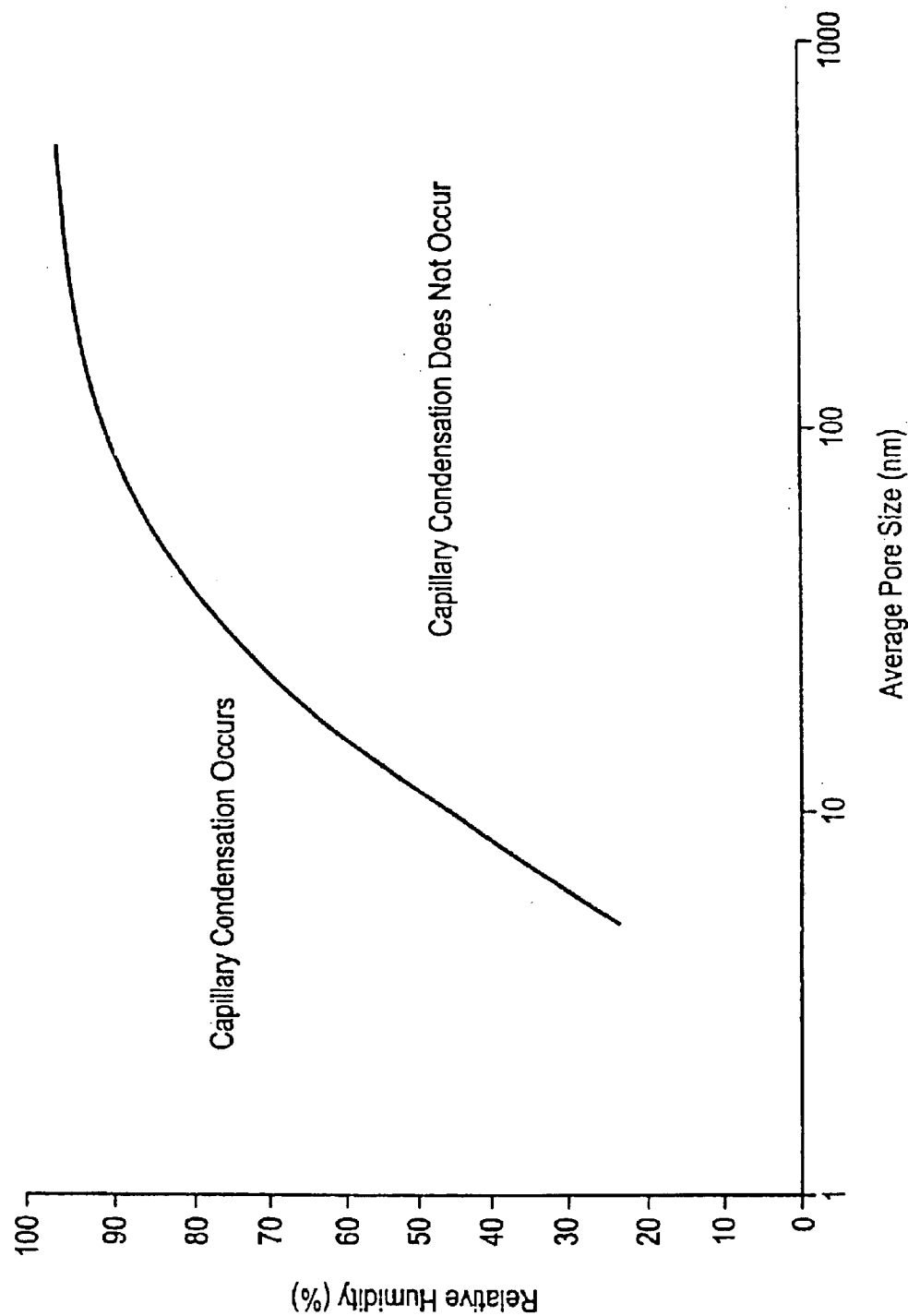
FIG. 2 is a graph showing capillary condensation as a function of average pore size for a given catalytic material.

As shown in FIG. 2 and in accordance with the present invention, as the average pore size increases, the relative humidity necessary to induce capillary condensation significantly increases. Capillary condensation is initiated at low pore sizes (an average pore size of less than 5 nm) at low relative humidity conditions (i.e. ≦50%). Thus increasing the average pore size to at least 5 nm prevents or substantially reduces capillary condensation to relative humidities of up to about 50% when the catalytic material has a surface area of at least 100 $m^2/g$. Increasing the average pore size to a preferred range of at least 10 nm and more preferably from about 15 to 50 nm substantially eliminates capillary condensation to relative humidities up to about 75%.

Figure 3:
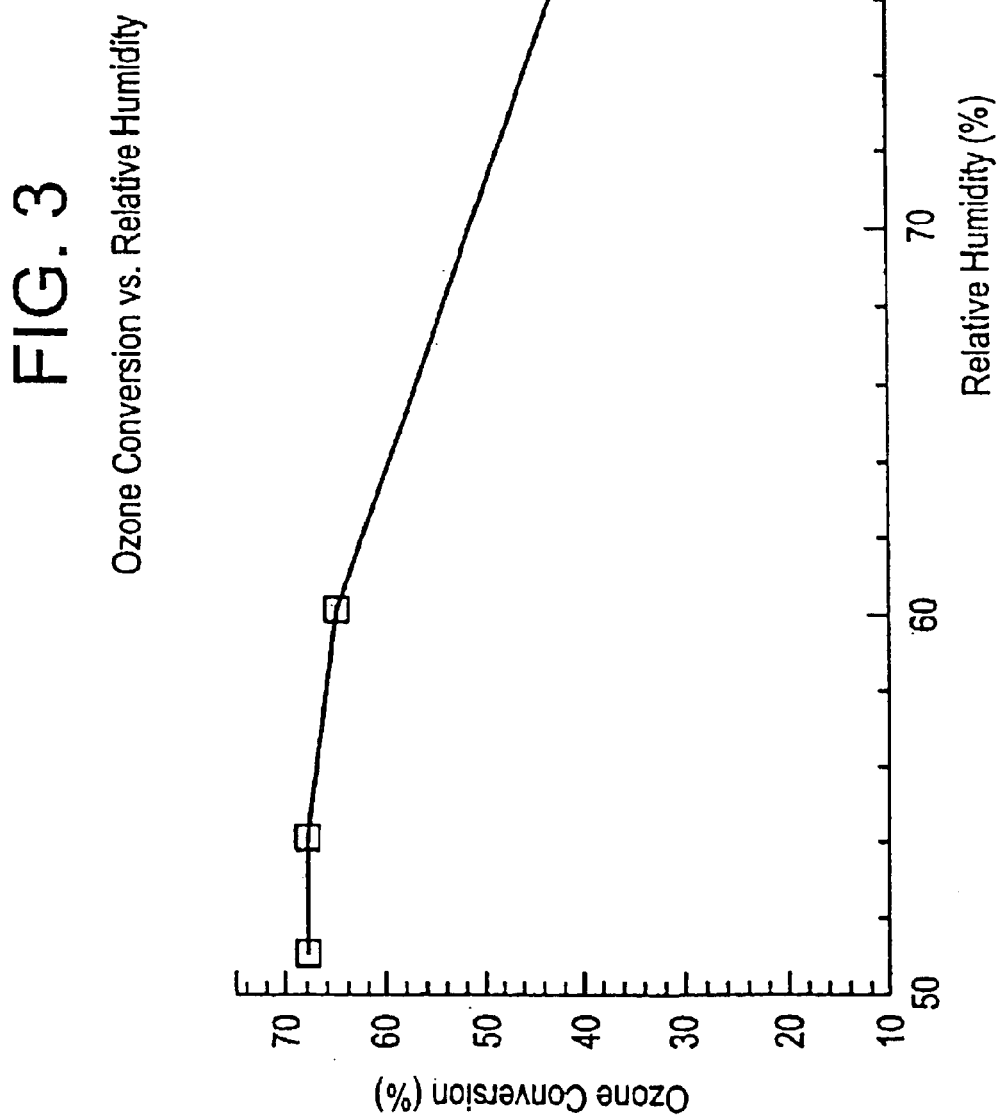
FIG. 3 is a graph showing the efficiency of ozone conversion as a function of relative humidity.

The effect of relative humidity on the ability of a catalyst to convert ozone to harmless byproducts is shown in FIG. 3. These results were obtained by passing 1.53 L/min of air containing 5 ppm of ozone through 50 mg of high surface area α-$MnO_2$ at 25–27° C. As shown in FIG. 3, about 65–68% conversion of ozone was achieved at a relative humidity of from about 50 to 60%. However, as the relative humidity increased, especially above 60% (e.g. 90%) there was a noticeable decline in the ozone conversion rate to 19%. The significant decline in conversion rate is due at least in large part to the presence of water in vicinity of the catalytically active sites due to capillary condensation.

The catalytic materials which can be employed in the present invention can vary widely but generally include platinum group metals, base metals, alkaline earth metals, rare earth metals and transition metals.

The platinum group metals include platinum, palladium, iridium, and rhodium. The base metals include manganese, copper, nickel, cobalt, silver and gold. The alkaline earth metals include beryllium, magnesium, calcium, strontium, barium, and radium. The rare earth metals include cesium, praseodymium, neodymium, promethium, samarium, europium, gadolinium, terbium, dysprosium, holmium, erbium, thulium, ytterbium, and lutetium. Early transition metals include scandium, yttrium, lanthanum, tympanum, zirconium, and hafnium.

Examples of such catalytic materials are disclosed in U.S. Pat. No. 5,139,992, U.S. Pat. No. 5,128,306, U.S. Pat. No. 5,057,483, U.S. Pat. No. 5,024,981, U.S. Pat. No. 5,254,519, and U.S. Pat. No. 5,212,142, each of which is incorporated herein by reference.

The most preferred catalytic materials for use in the present invention are those which contain manganese and particularly those which contain manganese dioxide as explained in detail hereinafter. Such catalytic materials are especially suitable for treating ozone.

Ozone treating catalyst compositions comprise manganese compounds including manganese dioxide, non stoichiometric manganese dioxide (e.g., $XMnO_{(1.52.0)}$), and/or $XMn_2O_3$ wherein X is a metal ion, preferably an alkali metal or alkaline earth metal (e.g. sodium, potassium and barium). Variable amounts of water ($H_2O$, $OH^-$) can be incorporated in the structure as well. Preferred manganese dioxides, which are nominally referred to as $MnO_2$ have a chemical formula wherein the molar ratio of manganese to oxide is about from 1.5 to 2.0. Up to 100 percent by weight of manganese dioxide $MnO_2$ can be used in catalyst compositions to treat ozone. Alternative compositions which are available comprise manganese dioxide and compounds such as copper oxide alone or copper oxide and alumina. In accordance with the present invention, the most dramatic improvement in catalytic efficiency with higher pore size distribution is seen with catalyst containing manganese dioxide alone.

Useful and preferred manganese dioxides are alpha-manganese dioxides nominally having a molar ratio of manganese to oxygen of from 1 to 2. Useful alpha manganese dioxides are disclosed in U.S. Pat. No. 5,340,562 to O'Young, et al.; also in O'Young, Hydrothermal Synthesis of Manganese Oxides with Tunnel Structures presented at the Symposium on Advances in Zeolites and Pillared Clay Structures presented before the Division of Petroleum Chemistry, Inc. American Chemical Society New York City Meeting, Aug. 25–30, 1991 beginning at page 342; and in McKenzie, the Synthesis of Birnessite, Cryptomelane, and Some Other Oxides and Hydroxides of Manganese, Mineralogical Magazine, December 1971, Vol. 38, pp. 493–502. For the purposes of the present invention, the preferred alpha-manganese dioxide is selected from hollandite ($BaMn_8O_{16} \cdot xH_2O$), cryptomelane ($KMn_8O_{16} \cdot xH_2O$), manjiroite ($NaMn_8O_{16} \cdot xH_2O$) or coronadite ($PbMn_8O_{16} \cdot xH_2O$).

The manganese dioxides useful in the present invention preferably have a surface area as high as possible while maintaining a pore size distribution of at least 10 nm. A preferred surface area is at least 100 $m^2/g$.

The composition preferably comprises a binder as of the type described below with preferred binders being polymeric binders. The composition can further comprise precious metal components with precious metal components being the oxides of precious metal, including the oxides of platinum group metals and oxides of palladium or platinum also referred to as palladium black or platinum black. The amount of palladium or platinum black can range from 0 to 25%, with useful amounts being in ranges of from about 1 to 25 and 5 to 15% by weight based on the weight of the manganese component and the precious metal component.

It has been found that the use of compositions comprising the cryptomelane form of alpha manganese oxide, which also contain a polymeric binder can result in greater than 50%, preferably greater than 60% and typically from 75–85% conversion of ozone in a concentration range of up to 400 parts per billion (ppb).

The preferred cryptomelane manganese dioxide has a crystallite size ranging from 2 to 10 nm and preferably less than 5 nm. It can be calcined at a temperature range of from 250° C. to 550° C. and preferably below 500° C. and greater than 300° C. for at least 1.5 hours and preferably at least 2 hours up to about 6 hours.

The preferred cryptomelane can be made in accordance with methods described and incorporated into U.S. patent application Ser. No. 08/589,182 filed Jan. 19, 1996, incorporated herein by reference. The cryptomelane can be made by reacting a manganese salt including salts selected from the group consisting $MnCl_2$, $Mn(NO_3)_2$, $MnSO_4$ and $Mn(CH_3COO)_2$ with a permanganate compound. Cryptomelane is made using potassium permanganate; hollandite is made using barium permanganate; coronadite is made using lead permanganate; and manjiroite is made using sodium permanganate. It is recognized that the alpha-manganese dioxide useful in the present invention can contain one or more of hollandite, cryptomelane, manjiroite or coronadite compounds. Even when making cryptomelane minor amounts of other metal ions such as sodium may be present. Useful methods to form the alpha-manganese dioxide are described in the above references which are incorporated herein by reference.

The preferred alpha-manganese dioxide for use in accordance with the present invention is cryptomelane. The preferred cryptomelane is "clean" or substantially free of inorganic anions, particularly on the surface. Such anions could include chlorides, sulfates and nitrates which are introduced during the method to form cryptomelane. An alternate method to make the clean cryptomelane is to react a manganese carboxylate, preferably manganese acetate, with potassium permanganate.

It is believed that the carboxylates are burned off during the calcination process. However, inorganic anions remain on the surface even during calcination. The inorganic anions such as sulfates can be washed away with the aqueous solution or a slightly acidic aqueous solution. Preferably the alpha manganese dioxide is a "clean" alpha manganese dioxide. The cryptomelane can be washed at from about 60° C. to 100° C. for about one-half hour to remove a significant amount of sulfate anions. The nitrate anions may be removed in a similar manner. The "clean" alpha manganese dioxide is characterized as having an IR spectrum as disclosed in U.S. patent application Ser. No. 08/589,182 filed Jan. 19, 1996.

A preferred method of making cryptomelane useful in the present invention comprises mixing an aqueous acidic manganese salt solution with a potassium permanganate solution. The acidic manganese salt solution preferably has a pH of from 0.5 to 3.0 and can be made acidic using any common acid, preferably acetic acid at a concentration of from 0.5 to 5.0 normal and more preferably from 1.0 to 2.0 normal. The mixture forms a slurry which is stirred at a temperature range of from 50° C. to 110° C. The slurry is filtered and the filtrate is dried at a temperature range of from 75° C. to 200°

C. The resulting cryptomelane crystals have a surface area of typically in the range of at least 100 m²/g.

Catalytic materials with an average pore size of at least 5 nm in accordance with the present invention can be made, for example, by heat treating the material after crystallization. The post-crystallization material can be heated to temperatures sufficient to increase the average pore size to at least 5 nm. In most cases, the post-crystallization heat-treating temperature is in the range of from about 300 to 500° C.

Other useful compositions comprise manganese dioxide and optionally copper oxide and alumina and at least one precious metal component such as a platinum group metal supported on the manganese dioxide and where present copper oxide and alumina. Useful compositions contain up to 100, from 40 to 80 and preferably 50 to 70 weight percent manganese dioxide 10 to 60 and typically 30 to 50 percent copper oxide. Useful compositions include hopcalite (supplied by, for example, Mine Safety Applications, Inc.) which is about 60 percent manganese dioxide and about 40 percent copper oxide: and Carulite® 200 (sold by Carus Chemical Co.) which is reported to have 60 to 75 weight percent manganese dioxide, 11 to 14 percent copper oxide and 15 to 16 percent aluminum oxide. The surface area of Carulite® 200 is reported to be about 180 m²/g. Calcining at 450° C. reduces the surface area of the Carulite® by about fifty percent (50%) without significantly affecting activity. It is preferred to calcine manganese compounds at from 300° C. to 500° C. and more preferably 350° C. to 450° C. Calcining at 550° C. causes a great loss of surface area and ozone treatment activity. Calcining the Carulite® after ball milling with acetic acid and coating on a substrate can improve adhesion of the coating to a substrate.

Other compositions to treat ozone can comprise a manganese dioxide component and precious metal components such as platinum group metal components. While both components are catalytically active, the manganese dioxide can also support the precious metal component. The platinum group metal component preferably is a palladium and/or platinum component. The amount of platinum group metal compound preferably ranges from about 0.1 to about 10 weight percent (based on the weight of the platinum group metal) of the composition. Preferably, where platinum is present it is present in amounts of from 0.1 to 5 weight percent, with useful and preferred amounts on pollutant treating catalyst volume, based on the volume of the supporting article, ranging from about 0.5 to about 70 g/ft³. The amount of the palladium component preferably ranges from about 2 to about 10 weight percent of the composition, with useful and preferred amounts on pollutant treating catalyst volume ranging from about 10 to about 250 g/ft³.

Various useful and preferred pollutant treating catalyst compositions, especially those containing a catalytically active component such as a precious metal catalytic component, can comprise a suitable support material such as a refractory oxide support. The preferred refractory oxide can be selected from the group consisting of silica, alumina, titania, ceria, zirconia and chromia, and mixtures thereof. More preferably, the support is at least one activated, high surface area compound selected from the group consisting of alumina, silica, titania, silica-alumina, silica-zirconia, alumina silicates, alumina zirconia, alumina-chromia and alumina-ceria. The refractory oxide can be in suitable form including bulk particulate form typically having particle sizes ranging from about 0.1 to about 100 and preferably 1 to 10 μm or in sol form also having a particle size ranging from about 1 to about 50 and preferably about 1 to about 10 nm. A preferred titania sol support comprises titania having a particle size ranging from about 1 to about 10, and typically from about 2 to 5 nm.

Also useful as a preferred support is a coprecipitate of a manganese oxide and zirconia. This composition can be made as recited in U.S. Pat. No. 5,283,041, incorporated herein by reference. The coprecipitated support material preferably comprises in a ratio based on the weight of manganese and zirconium metals from about 5:95 to 95:5; preferably from about 10:90 to 75:25; more preferably from about 10:90 to 50:50; and most preferably from about 15:85 to 50:50. A useful and preferred embodiment comprises a Mn:Zr weight ratio of about 20:80. U.S. Pat. No. 5,283,041 describes a preferred method to make a coprecipitate of a manganese oxide component and a zirconia component. A zirconia oxide and manganese oxide material may be prepared by mixing aqueous solutions of suitable zirconium oxide precursors such as zirconium oxynitrate, zirconium acetate, zirconium oxychloride, or zirconium oxysulfate and a suitable manganese oxide precursor such as manganese nitrate, manganese acetate, manganese dichloride or manganese dibromide, adding a sufficient amount of a base such as ammonium hydroxide to obtain a pH of from about 8 to 9, filtering the resulting precipitate, washing with water, and drying at a temperature of from about 450° to 500° C.

A useful support for a catalyst to treat ozone is selected from a refractory oxide support, preferably alumina and silica-alumina with a more preferred support being a silica-alumina support comprising from about 1% to 10% by weight of silica and from about 90% to 99% by weight of alumina.

The average pore size of the catalytic material including the preferred materials described above is at least 5 nm, preferably at least 10 nm, more preferably from about 15 to 50 nm. At this average pore size, any water molecules which enter the pores are readily disengaged from catalytic sites without the imposition of excessive energy such as thermal energy. Accordingly, the method of the present invention is particularly suited to the catalytic conversion of a pollutant-containing gas (e.g. exhaust gas) at reduced operating temperatures. The method of the present invention is particularly suited to the efficient and effective conversion of pollutants to harmless by-products when an engine of an automotive vehicle is under startup conditions (i.e. generally less than 45° C.). The catalytic materials of the present invention are particularly suited for the conversion of carbon monoxide and ozone.

EXAMPLE 1

61 grams of a powdered catalytic material containing noncrystalline $KMn_8O_{16}$ prepared by methods described in "Microstructural Study of Hollandite-type $MnO_2$ Nanofibers" M. Benaissa et al. *App. Physics Letters*, Vol. 70, No. 16, pp.2120–2122 (1997) and "Nickel Hydroxide and other Nanophase Cathode Materials For Rechargeable Batteries" D. E. Reisner et al. *J. Power Sources* Vol. 65, No. 1–2, pp. 231–233 (1997) was treated in the following manner. The material is comprised of primary crystallites having a fibrous shape with aspect ratios of about 10:1 (i.e. 10–100 nm wide×100–1,000 nm long). The fibrous crystallites form loosely compacted subspherical agglomerates resembling nests up to about 10 μm across. The bulk of density of the material is about 0.3 to 0.6 g/cm³. The powder was pressed, granulated and sized so that the resulting material had an average pore size of 32.2 nm, a pore volume (the total volume divided by the average pore size) of 0.98 cm³/g and a surface area of 122 m²/g. Equal volumes (0.13 cm³) of the powder were loaded into glass tubes and secured into a bed with glass wool. The samples were run on a temperature and humidity controlled flow reactor equipped with an ozone generator and UV ozone analyzer.

A gas containing 5 ppm of ozone in air was passed through the sample bed at a space velocity of 150,000 hr$^{-1}$ at 45° C. with a dew point of 17° C. for 2 hours. The instantaneous conversion of ozone to oxygen at the end of two hours is shown in Table 1.

TABLE 1

| | SURFACE AREA$^a$, m$^2$/g | PORE VOLUME$^b$, cm$^3$/g | AVG. PORE DIAMETER nm | OZONE CONVERSION % | SAMPLE MASS |
|---|---|---|---|---|---|
| EXAMPLE 1 | 122 | 0.98 | 32.2 | 99 | 61 mg |
| COMPARATIVE EXAMPLE 1 | 44 | 0.21 | 18.6 | 99 | 91 mg |
| COMPARATIVE EXAMPLE 2 | 84 | 0.20 | 9.4 | 72 (1.3 hr) | 135 mg |

$^a$BET surface area measured by N$_2$ adsorption after drying sample at 250° C.
$^b$Total pore volume and average pore diameter determined by N$_2$ adsorption.

As shown in Table 1, the % conversion of ozone for Example 1 was 99%. This example employed an average pore diameter and surface area which minimized capillary condensation. The % conversion was achieved with a low mass of catalytic material.

COMPARATIVE EXAMPLE 1

91 grams of a starting material containing activated MnO$_2$ obtained from Johnson Matthey Alfa Aesar (Technical Grade Stock No. 14340) was comprised of nearly equant or subspherical crystallites with diameters of from about 50 to 100 nm. The crystallites form dense aggregates and agglomerates up to about 20 μm across. The bulk density of this material is from about 1.1 to 1.3 g/m$^2$. The final catalytic material was obtained by heating the starting material to 450° C. for 2 hours to obtain an average pore size distribution of 18.6 nm.

As shown in Table 1 the % conversion of ozone initiated by the catalytic material was 99%. However, a larger mass of catalytic material was needed to achieve high conversion rates due to the relatively small surface area (44 m$^2$/g) and pore volume (0.21 cm$^3$/g) as compared to the catalytic material of Example 1.

COMPARATIVE EXAMPLE 2

The same catalytic material employed in Comparative Example 2 was used except that the step of heating to 450° C. was omitted. The resulting material was comprised of nearly equant or subspherical crystallites on the order of about 5 to 25 nm across that form subspherical aggregates and agglomerates up to 20 μm across, with an average pore size distribution of 9.4 nm. The bulk density of the material is between 0.9 and 1.1 g/cm$^3$.

The catalytic material was treated in the same manner as in Example 1 and Comparative Example 2 except that the reaction was terminated after 1.3 hours because the conversion rates were decreasing. The results of this comparative example showing the effectiveness of converting ozone to oxygen is shown in Table 1. The conversion rate for this comparative Example was only 72% despite using more than twice the amount of the catalytic material.

As shown in Table 1, the highest conversion rate with the lowest mass of material is achieved when the catalytic material (Example 1) has an average pore size equal to or exceeding about 5.0 nm, a pore volume equal to or exceeding about 0.9 cm$^3$/g and a surface area equal to or exceeding 100 m$^2$/g.

As further shown in Table 1, the comparative examples showed significantly lower conversion rates for even greater masses of material.

What is claimed is:

1. A catalytic composition, the catalytic composition comprising at least one catalytic material comprising manganese and having an average pore size of at least 5 nm, a surface area of at least 100 m$^2$/g and a pore volume of at least 0.9 cm$^3$/g.

* * * * *